United States Patent
Fan et al.

(10) Patent No.: US 7,852,511 B2
(45) Date of Patent: Dec. 14, 2010

(54) IMAGE PROCESSING APPARATUS AND METHOD, FOR PRODUCING A COLOR SEPARATION TABLE

(75) Inventors: Yingying Fan, Tokyo (JP); Kazuhiro Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 857 days.

(21) Appl. No.: 11/149,140

(22) Filed: Jun. 10, 2005

(65) Prior Publication Data

US 2005/0275858 A1    Dec. 15, 2005

(30) Foreign Application Priority Data

Jun. 14, 2004   (JP)   ............... 2004-176211

(51) Int. Cl.
G06F 15/00 (2006.01)
G06K 1/00 (2006.01)
G06K 9/00 (2006.01)
H04N 1/407 (2006.01)
H04N 1/46 (2006.01)
G06T 5/00 (2006.01)
G03F 3/08 (2006.01)

(52) U.S. Cl. .................. 358/1.9; 358/3.27; 358/515; 358/518; 358/523; 358/525; 382/162; 382/167

(58) Field of Classification Search ................ 358/1.1, 358/1, 9, 518, 515, 500; 382/162, 167
See application file for complete search history.

(56) References Cited

U.S. PATENT DOCUMENTS

| | | | | |
|---|---|---|---|---|
| 5,060,276 A | * | 10/1991 | Morris et al. | 382/151 |
| 5,377,321 A | * | 12/1994 | Kaneko et al. | 358/1.1 |
| 5,621,546 A | * | 4/1997 | Klassen et al. | 358/536 |
| 5,872,896 A | * | 2/1999 | Li et al. | 358/1.9 |
| 6,356,647 B1 | * | 3/2002 | Bober et al. | 382/107 |
| 6,637,849 B2 | * | 10/2003 | Maltz | 347/15 |
| 2003/0007687 A1 | * | 1/2003 | Nesterov et al. | 382/167 |
| 2003/0069712 A1 | * | 4/2003 | Saito | 702/127 |
| 2004/0062437 A1 | * | 4/2004 | Luo et al. | 382/166 |

FOREIGN PATENT DOCUMENTS

| | | |
|---|---|---|
| JP | 2003-116016 | 4/2003 |
| JP | 2005-236802 | 9/2005 |

OTHER PUBLICATIONS

Office Action dated Sep. 1, 2009 in JP 2004-176211.

* cited by examiner

*Primary Examiner*—Twyler L Haskins
*Assistant Examiner*—Ming Hon
(74) *Attorney, Agent, or Firm*—Fitzpatrick, Cella Harper & Scinto

(57) ABSTRACT

A color separation table capable of performing both limitation of a color material applied in printing, and suppression of a false contour by smoothing processing satisfactorily is generated. Specifically, after generating the color separation table, smoothing processing is performed in order to obtain conformability between areas constituting the table. So as not to damage smoothness of lattice point data achieved by this smoothing processing, due to landing amount correction processing, landing amount correction is performed for an object lattice point and lattice points in a 3×3×3 range around it.

8 Claims, 15 Drawing Sheets

FIG.14A

| X4 | X3 | X4 | | X3 | X2 | X3 | | X4 | X3 | X4 |
|---|---|---|---|---|---|---|---|---|---|---|
| X3 | X2 | X3 | | X2 | X1 | X2 | | X3 | X2 | X3 |
| X4 | X3 | X4 | | X3 | X2 | X3 | | X4 | X3 | X4 |

FIG.14B

| (k1-1,k2-1,k3-1) | (k1,k2-1,k3-1) | (k1+1,k2-1,k3-1) | | (k1-1,k2-1,k3) | (k1,k2-1,k3) | (k1+1,k2-1,k3) | | (k1-1,k2-1,k3+1) | (k1,k2-1,k3+1) | (k1+1,k2-1,k3+1) |
|---|---|---|---|---|---|---|---|---|---|---|
| (k1-1,k2,k3-1) | (k1,k2,k3-1) | (k1+1,k2,k3-1) | | (k1-1,k2,k3) | (k1,k2,k3) | (k1+1,k2,k3) | | (k1-1,k2,k3+1) | (k1,k2,k3+1) | (k1+1,k2,k3+1) |
| (k1-1,k2+1,k3-1) | (k1,k2+1,k3-1) | (k1+1,k2+1,k3-1) | | (k1-1,k2+1,k3) | (k1,k2+1,k3) | (k1+1,k2+1,k3) | | (k1-1,k2+1,k3+1) | (k1,k2+1,k3+1) | (k1+1,k2+1,k3+1) |

IMAGE PROCESSING APPARATUS AND METHOD, FOR PRODUCING A COLOR SEPARATION TABLE

BACKGROUND OF THE INVENETION

1. Field of the Invention

The present invention relates to an image processing apparatus and an image processing method, and particularly to generation of a color separation table used in conversion of an image signal into a signal of quantity of color material such as ink or toner.

2. Description of the Related Art

As one of methods of generating this kind of color separation table, a method using a colorimetry value of a patch on a predetermined lattice point has been known. For example, regarding lattice points on predetermined lines connecting vertexes of a cube defined in RGB space, on the basis of the colorimetry value of the patch, lattice point data (color separation data) is obtained. Regarding other lattice points which do not exist on these lines, lattice point data is obtained by interpolation using the lattice point data of the lattice points on the predetermined lines (Japanese Patent Application Laid-open No. 2003-116016). In the interpolation in this method, the above cube is divided into six tetrahedrons having the above lines as their sides, and further, in each tetrahedron, plural triangles parallel to one triangle of the tetrahedron are defined, whereby two-dimensional interpolation is performed for the respective triangles. This interpolation provides lattice point data of lattice points inside its triangle.

In this method, generally, after interpolation processing, smoothing processing is performed for the lattice point data. For example, smoothing of filtering by use of a low pass filter is performed. Hereby, such an adverse effect can be reduced that change of the lattice point data becomes discontinuous in a boundary between these interpolation areas due to the interpolation performed for each tetrahedron. Then, printing is performed based on the lattice point data of a table generated by such the processing, and a printed image can be prevented from having a false contour generated due to the above discontinuity.

FIG. 15 is a flowchart showing the above-described conventional table generating processing. In FIG. 15, firstly, in a step S151, regarding lattice points of a W-K line, each line of W-C, M, Y, R, G, B, each line of C, M, Y, R, G, B-K, and each line of M-R, R-Y, Y-G, G-C, C-B, B-M, which connect vertexes of a cube defined in RGB space, color separation data are obtained. Namely, a color separation table for the above each line is generated.

Next, in a step S152, internal interpolation processing is performed, using the obtained lattice point data on each line, whereby color separation data is obtained for lattice points in portions other than the above line. In a step S153, smoothing processing is performed for the obtained color separation data, and the table generation processing ends.

Thus, performing smoothing processing allows distortion of the color separation table caused by obtaining the color separation data in the interpolation processing for each of the plural areas obtained by dividing the cube, and distortion caused by the internal interpolation processing, to be removed. As a result, it can be suppressed that the false contour is produced in an image printed on the basis of the color separation data obtained by this color separation table.

The color separation table is generated basically on the basis of the color-measured patch. Further, it has been also known that lattice point data is so determined as to control the quantity of the color material in consideration with attachment property of the color material onto a printing medium such as paper, for example, ink absorbency in case that the color material is ink. For example, the maximum quantity of ink which the printing medium of the predetermined area can absorb is previously obtained, and the color material quantity of each color which is the above-obtained lattice point data is corrected so as not to exceed the obtained maximum quantity. In this case, if the color material quantity correction processing is performed without taking the above smoothing processing into consideration, the result by the smoothing processing is impaired by the correction processing, so that such an adverse effect may be produced that the false contour is conspicuous in a printed image. Alternatively, limiting of the color material quantity is not enough, so that bleeding of ink may occur in the printed image.

SUMMARY OF THE INVENTION

An object of the invention is to provide an image processing apparatus and an image processing method, in which a color separation table, which can make it possible to perform both limiting of color material applied in printing and suppression of the false contour by smoothing processing satisfactorily, can be generated.

In the first aspect of the present invention, there is provided an image processing apparatus for generating a color separation table which is used for processing of converting image signals into signals of color materials used in a printing apparatus, the color separation table storing grid point data of the color material signals correspondingly to grid points defined by the image signals, the apparatus comprising:

table data generating means for obtaining the grid point data for the grid points constituting the color separation table;

smoothing means for performing smoothing processing for the grid point data obtained by the table data generating means; and correction means for executing correction for the grid point data, value of which exceeds a predetermined value that is criterion of judgment that an amount of color material applied to a printing medium in the printing apparatus is over, among the grid point data having been subjected to the smoothing processing by the smoothing means, so as to reduce the value, the correction being executed for the grid point data of the grid point having the grid point data the value of which exceeds the predetermined value, and of grid points around the grid point having the data the value of which exceeds the predetermined value.

In the second aspect of the present invention, there is provided an image processing apparatus for generating a color separation table which is used for processing of converting image signals into signals of color materials used in a printing apparatus, the color separation table storing grid point data of the color material signals correspondingly to grid points defined by the image signals, the apparatus comprising:

table data generating means for obtaining the grid point data for the grid points constituting the color separation table;

correction means for, when the grid point data, value of which exceeds a predetermined value that is criterion of judgment that an amount of color material applied to a printing medium in the printing apparatus is over, exists among the grid point data generated by the table data generating means, executing correction for whole of the grid point data generated by the table data generating means so as to reduce the value of the grid point data; and smoothing means for performing smoothing processing for the grid point data corrected by the correction means.

In the third aspect of the present invention, there is provided an image processing method of generating a color separation table which is used for processing of converting image signals into signals of color materials used in a printing apparatus, the color separation table storing grid point data of the color material signals correspondingly to grid points defined by the image signals, the method comprising:

table data generating step for obtaining the grid point data for the grid points constituting the color separation table;

smoothing step for performing smoothing processing for the grid point data obtained by the table data generating step; and correction step for executing correction for the grid point data, value of which exceeds a predetermined value that is criterion of judgment that an amount of color material applied to a printing medium in the printing apparatus is over, among the grid point data having been subjected to the smoothing processing by the smoothing step, so as to reduce the value, the correction being executed for the grid point data of the grid point having the grid point data the value of which exceeds the predetermined value, and of grid points around the grid point having the data the value of which exceeds the predetermined value.

In the fourth aspect of the present invention, there is provided an image processing method of generating a color separation table which is used for processing of converting image signals into signals of color materials used in a printing apparatus, the color separation table storing grid point data of the color material signals correspondingly to grid points defined by the image signals, the method comprising:

table data generating step for obtaining the grid point data for the grid points constituting the color separation table;

correction step for, when the grid point data, value of which exceeds a predetermined value that is criterion of judgment that an amount of color material applied to a printing medium in the printing apparatus is over, exists among the grid point data generated by the table data generating step, executing correction for whole of the grid point data generated by the table data generating step so as to reduce the value of the grid point data; and smoothing step for performing smoothing processing for the grid point data corrected by the correction step.

In the fifth aspect of the present invention, there is provided an image processing method of converting image signals into signals of color materials using a color separation table which is used for processing of converting the image signals into the signals of color material used in a printing apparatus, the color separation table storing grid point data of the color material signals correspondingly to grid points defined by the image signals, wherein the color separation table is generated by image processing, the image processing comprising:

table data generating step for obtaining the grid point data for the grid points constituting the color separation table;

smoothing step for performing smoothing processing for the grid point data obtained by the table data generating step; and correction step for executing correction for the grid point data, value of which exceeds a predetermined value that is criterion of judgment that an amount of color material applied to a printing medium in the printing apparatus is over, among the grid point data having been subjected to the smoothing processing by the smoothing step, so as to reduce the value, the correction being executed for the grid point data of the grid point having the grid point data the value of which exceeds the predetermined value, and of grid points around the grid point having the data the value of which exceeds the predetermined value.

In the sixth aspect of the present invention, there is provided an image processing method of converting image signals into signals of color materials using a color separation table which is used for processing of converting the image signals into the signals of color material used in a printing apparatus, the color separation table storing grid point data of the color material signals correspondingly to grid points defined by the image signals, wherein the color separation table is generated by image processing, the image processing comprising:

table data generating step for obtaining the grid point data for the grid points constituting the color separation table;

correction step for, when the grid point data, value of which exceeds a predetermined value that is criterion of judgment that an amount of color material applied to a printing medium in the printing apparatus is over, exists among the grid point data generated by the table data generating step, executing correction for whole of the grid point data generated by the table data generating step so as to reduce the value of the grid point data; and smoothing step for performing smoothing processing for the grid point data corrected by the correction step.

According to the above structure, among lattice point data having been subjected to a smoothing process, for lattice point data of which a value exceeds a predetermined value by which it is judged that the quantity of color material given on a printing medium in a printing apparatus is excessive for the printing medium, correction is performed so that its value is reduced. In this correction, the lattice point having the lattice point data over the predetermined value and lattice point data of lattice points around that lattice point of over the predetermined vale are corrected. Hereby, it can be suppressed that a result by smoothing processing for the lattice point data of the lattice point to be corrected becomes unconformable to the lattice point data of the lattice points around its lattice point due to the correction.

Further, according to another aspect of the present invention, when there is the lattice point data exceeding the above predetermined value, the whole of the generated lattice point data is corrected so as to reduce their values, and smoothing processing is performed for the corrected lattice point data. Therefore, the correction is wholly and together performed for the lattice point data similarly to the smoothing processing, and then an influence of the correction on the smoothing processing can be reduced, compared with a case in which the correction is performed partially.

As a result, both limitation of the amount of color material applied in printing and suppression of the false contour due to smoothing processing can be achieved very well.

The above and other objects, effects, features and advantages of the present invention will become more apparent from the following description of embodiments thereof taken in conjunction with the accompanying drawings.

BRIEF DESCRIPTION OF THE DRAWINGS

FIGS. 14A and 14B are diagrams for explaining a parameter for ink landing amount correcting calculation.

DETAILED DESCRIPTION OF PRFERRED EMBODIMENTS

Referring to drawings, embodiments of the invention will be described below in detail.

First Embodiment

Figure 1:
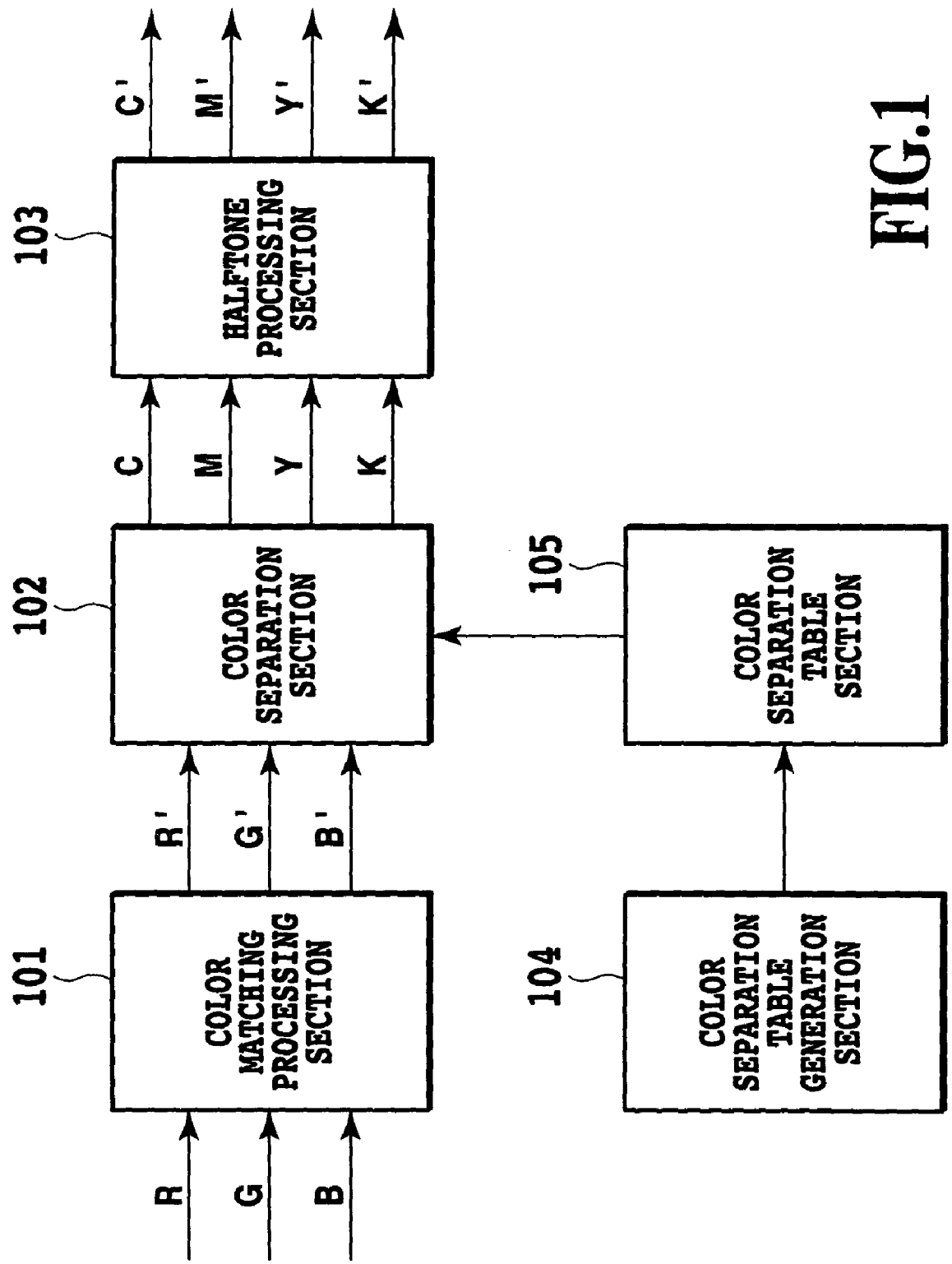
FIG. 1 is a block diagram showing construction of an image processing apparatus according to one embodiment of the invention.

FIG. 1 is a block diagram showing construction of an image processing apparatus according to one embodiment of the invention. Processing by the image processing apparatus in the embodiment is, as described later in FIG. 2, composed of processing by software or hardware in a printer. It should be noted that the application of the present invention is not limited to such the form. For example, the image processing apparatus may be a personal computer in which software such as a printer driver operates to execute the processing.

FIG. 1 shows processing in which respective 8-bit image data of R, G, B are converted into respective 8-bit color separation data of ink C, M, Y, K which are color materials used in a printer in the embodiment, and further the 8-bit color separation data are made respectively quantized 2-bit data of C, M, Y, K. In FIG. 1, a color matching processing section 101 performs color conversion for matching a color reproduction area of input image data RGB with a color reproduction area of the printer. A color separation processing section 102, on the basis of R' G' B' data from the color matching processing section 101, obtains lattice point data with reference to a color separation table, and performs interpolation operation using the lattice point data thereby to convert the R' G' B' data into data C, M, Y, K of each color ink used in the printer. Further, a halftone processing section 103 converts the 8-bit data of each color ink obtained by the ink separation processing section 102 into binary data C', M', Y', K' for use in the printer. Further, an ink color separation table section 105 provides a color separation table (a form of a look up table) used in the color conversion by the ink color separation processing section 102, and a color separation table generating section 104, as described later in FIG. 3 and subsequent drawings, generates the above ink color separation table.

Figure 2:
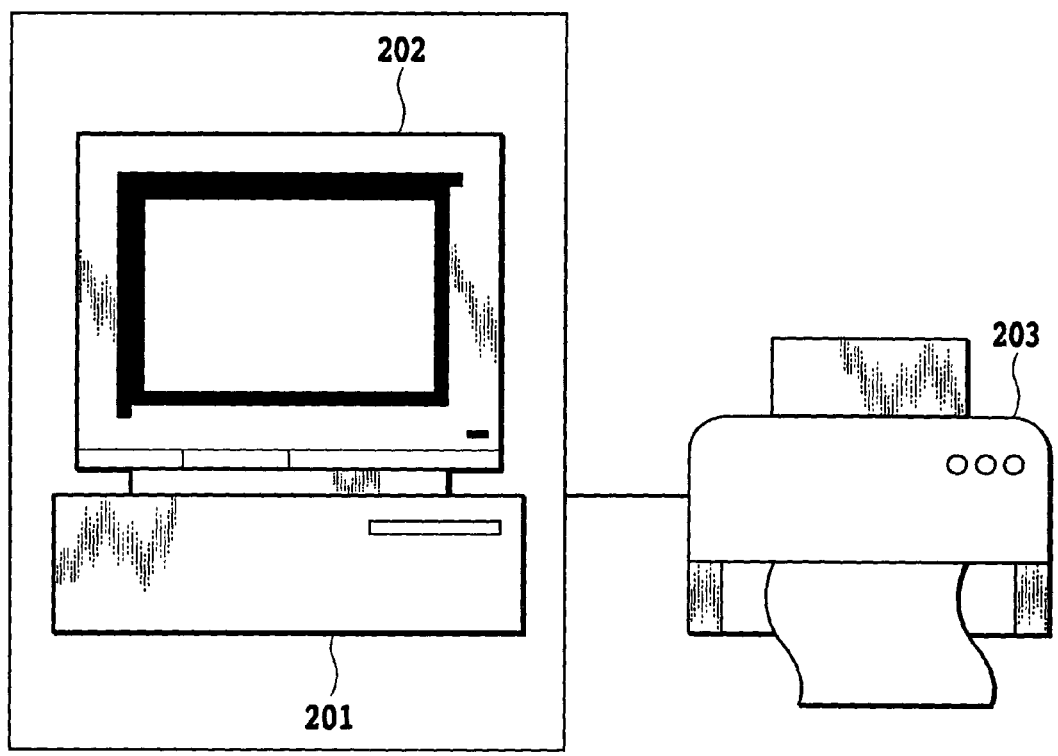
FIG. 2 is a block diagram showing constitution of a printing system according to one embodiment of the invention.

FIG. 2 is a block diagram showing construction of a printing system according to one embodiment of the. invention, which shows the system including a printer which constitutes the image processing apparatus shown in FIG. 1.

In FIG. 2, a computer 201 and a monitor 202 constitutes a host device for a printer 203. More specifically, the computer 201 holds image data for printing in order to cause the printer 203 to print an image displayed on the monitor 202, and supplies this image data to the printer 203 when performing printing. The printer 203 includes the construction of the image processing shown in FIG. 1 and functions as an image processing apparatus. Specifically, CPU, RAM, and ROM constituting a control section of the printer 203 construct each processing section shown in FIG. 1, and execute processing described later in FIGS. 6 to 8. Further, the printer 203 has an ink jet-type printing mechanism in the embodiment. More specifically, respective printing heads of Y, M, C, and K ink are scanned on a printing medium, ink is ejected to the printing medium during this scanning, and the printing medium is fed by a predetermined distance, whereby printing is performed. It should be noted that the printing system is not limited to the ink jet type. For example, an electrophotographic type using toner as color material can be also used.

In the above printing system, image data held by the computer 201 is transferred to the printer 203 through a cable provided between the printer 203 and the computer 201. It should be noted that, from another host device (not shown) connecting to a network, image data may be supplied to the printer 203. The printer 203, upon reception of the image data, firstly performs color matching processing for matching a color reproduction area of the monitor 202 with a color reproduction area of the printer 203 in the color matching processing section 101 shown in FIG. 1. Specifically, color conversion using a look up table and interpolation operation is performed. R' G' B' data obtained by the color matching processing is color-separated in the color separation processing section 102 by interpolation operation which uses data of the color separation table section 105 using the look up table generated previously. Specifically, referring to the color separation table section 105 by data R' G' B', is executed to read out color separation data C, M, Y, K from the table section, and an interpolation operation is performed for the read-out values with use of values of the data R' G' B', to obtain color separation data C, M, Y, K as color separated data. Then, these 8-bit data are converted, by the halftone processing section 103, into binary data C', M', Y', K' used in the printer, and the converted data are used in printing. It should be noted that quantization performed by the halftone processing section 103 is not limited to binarization, but four-valued data or five-valued data may be used according to a used dot pattern and a form of a printing mechanism.

The table data stored in the ink color separation table section 105 is previously generated by the color separation table generating section 104. Its generation processing according to one embodiment of the invention will be described with reference to FIGS. 3 to 8.

Figure 3:
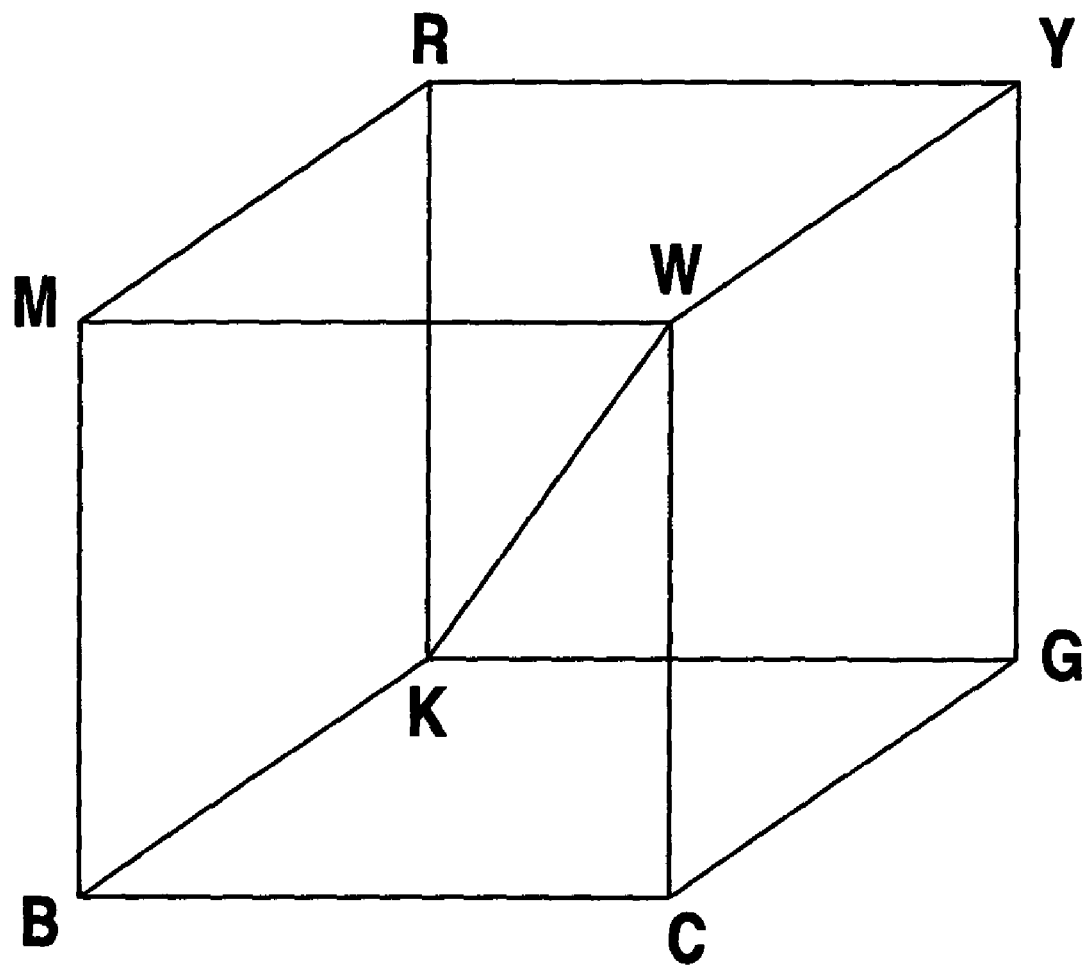
FIG. 3 is a diagram showing a cube in three-dimensional color space defined by R, G, and B signals.

FIG. 3 is a diagram showing a cube of three-dimensional space defined by R, G, and B signals. As shown in FIG. 3, according to a value of each 8-bit data of the R, G, B signals, a position in the cube, that is, color is determined. Eight vertexes of the cube show R(red), G(green), B(blue), Y(yellow), M(magenta), C(cyan), K(black), and W(white).

Figure 4:
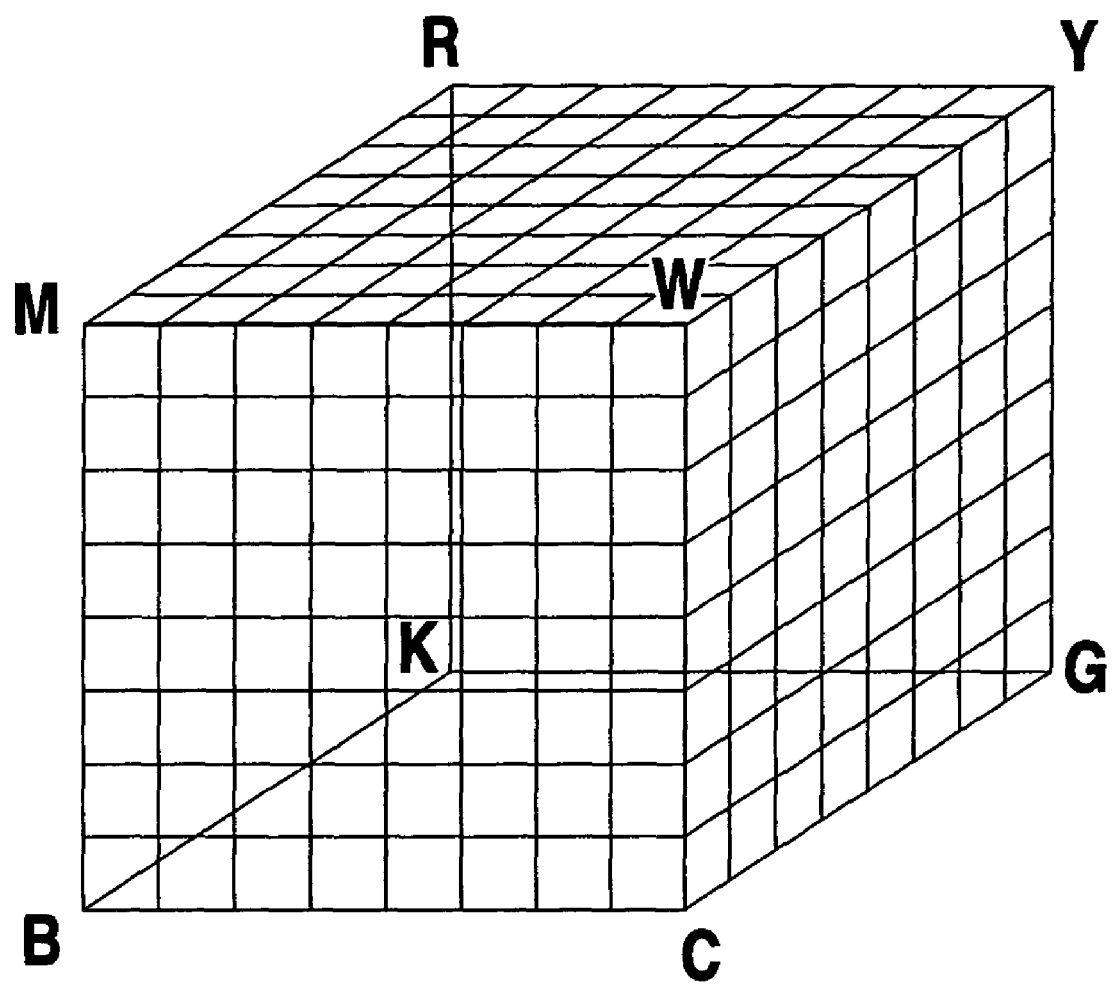
FIG. 4 is a diagram showing schematically a color separation table of a color separation table section 105.

FIG. 4 is a diagram schematically showing the color separation table of the color separation table section 105. More specifically, the color separation table section 105 expresses the predetermined position (color) in the cube defined by input data R', G' and B' as a lattice point, and stores color separation data (lattice point data) Y, M, C, K corresponding to the lattice point as table data. The color separation section 102 specifies the predetermined lattice point on the basis of the input R'G'B' data, reads out lattice point data of the predetermined lattice point and lattice point data of lattice points around the predetermined lattice point, and performs interpolation processing by use of their lattice point data. It should be noted that, as an interpolation method, any interpolation methods which have been known, such as tetrahedron interpolation and cube interpolation can be used.

Figure 5:
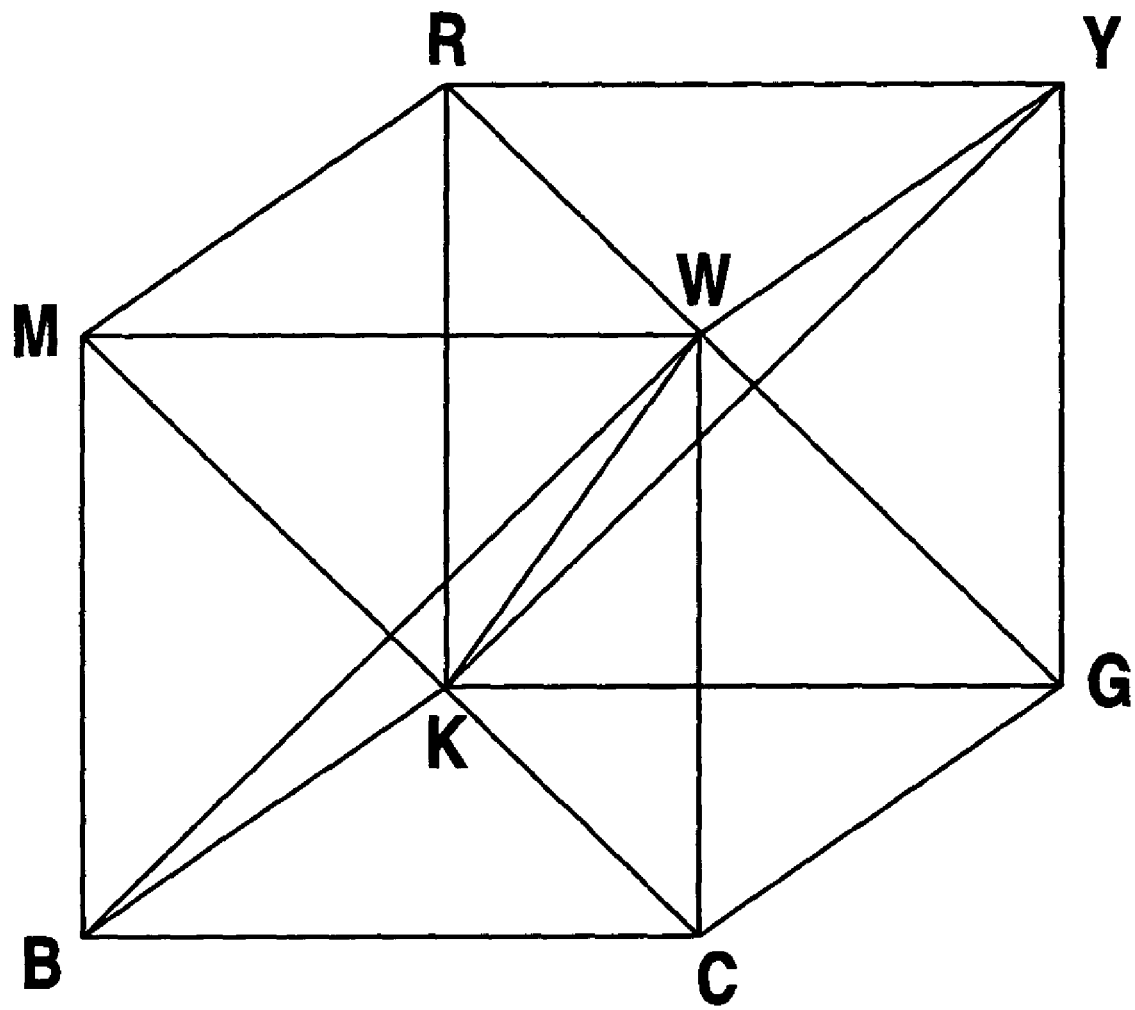
FIG. 5 is a diagram for explaining a method of generating a color separation table.

FIG. 5 is a diagram for explaining a method of generating a color separation table.

In the present embodiment, firstly, as shown in FIG. 5, for lines connecting eight vertexes of a cube W-C, M, Y, R, G, and B; B-K; M-R; R-Y; Y-G; G-C; M-B; B-C; and W-K (lines shown by thick solid lines), lattice point data of lattice points on each line are obtained, and next, lattice point data of lattice points other than the above lattice points on the lines are obtained by an interpolation operation. Here, when the bit number of the input data to the ink color separation processing section 102 is eight, coordinates of the respective vertexes W, C, M, Y, R, G, B, K are as follows:

W=(255, 255, 255), and W shows white, that is, color of print paper;

C=(0, 255, 255), and C shows cyan primary color;
M=(255, 0, 255), and M shows magenta primary color;
Y=(255, 255, 0), and Y shows yellow primary color;
R=(255, 0, 0), and R shows red primary color;
G=(0, 255, 0), and G shows green primary color;
B=(0, 0, 255), and B shows blue primary color; and
K=(0, 0, 0), and K shows black, that is, a darkest point by the printer.

Figure 6:
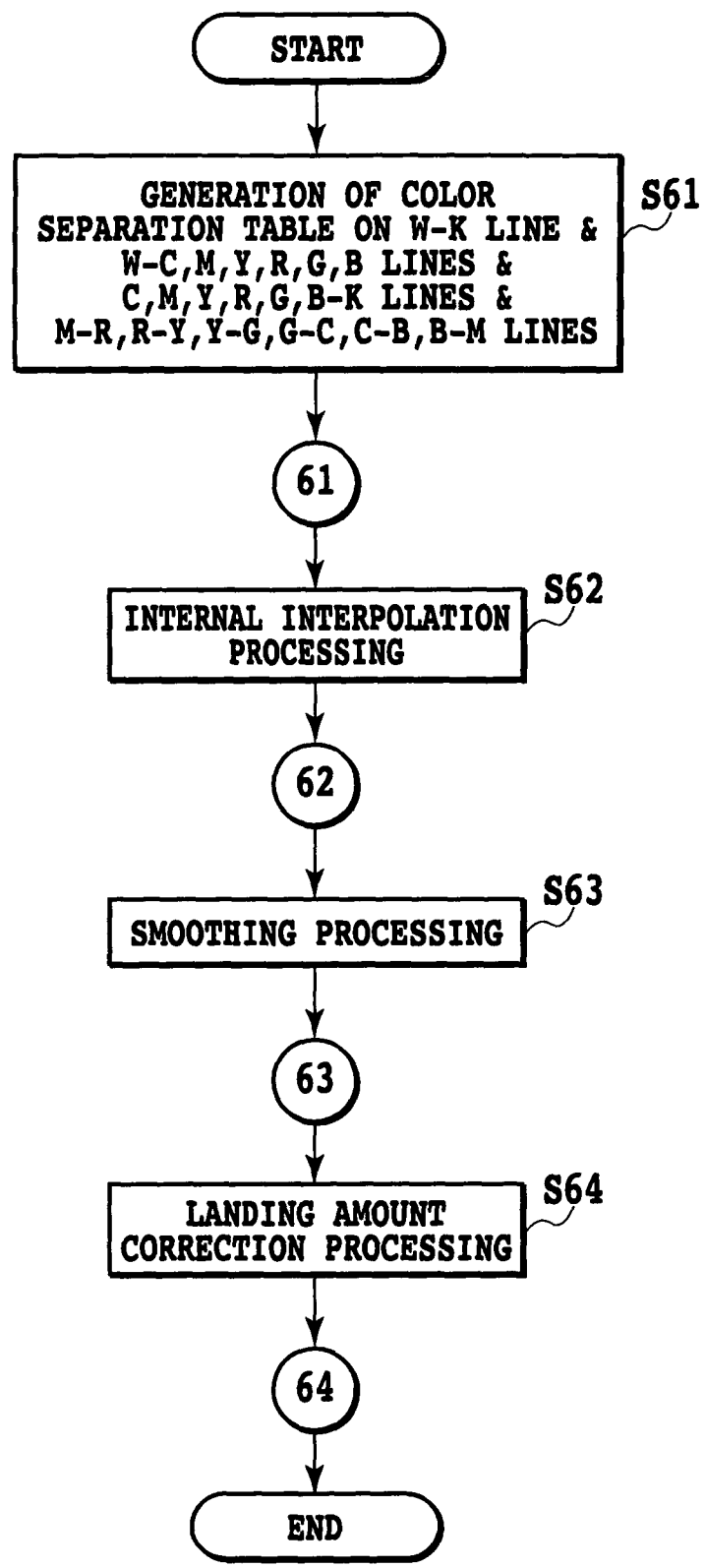
FIG. 6 is a flowchart showing generation processing of the color separation table executed by a color separation table generating section.

FIG. 6 is a flowchart showing a generation process of the color separation table by the color separation table generating section 104.

When this processing is started, firstly, in a step S61, as described above, lattice point data of lattice points on the respective lines W-K, M-R, R-Y, Y-G, G-C, C-B, B-M, W-C, M,Y,R,G, and B-K are obtained, and a color separation table on these lattice points are generated. In this embodiment, for respective combinations of values obtained by equally dividing values 0 to 255 of 8-bit data on each of C, M, Y, and K into 16, patches are previously print-outputted by the printer, respective colors of them are measured, and the respective colorimetry values are held. On the other hand, lattice point data (color separation data) of the lattice point corresponding to the vertex is previously set so that, for example, the vertex Y is (C, M, Y, K)=(0, 0, 255, 0). Then, the lattice point data (color separation data) of the lattice points on each line connecting to the vertexes are determined as follows. For example, in case of a line connecting the vertexes Y and R, colorimetry values of the patches respectively printed on the basis of a set of values (C, M, Y, K)=(0, 0, 255, 0) and (0, 255, 255, 0) previously set on the vertexes Y and R are obtained, and lattice points are defined so as to be distributed equally on the line connecting the above two colorimetry values in a uniform color space. Data (Y, M, C, K) outputting patches of colorimetry values closest to the colorimetry values (in the uniform color space) of these equally distributed lattice points are obtained as lattice point data for the respective lattice points. It should be noted that, in the above basic table generation, the patches are selected so that the optimum UCR amount and the optimum BG amount are set for each hue, whereby it is possible to set a table which suppresses an influence by a particle of ink stick as much as possible while making a color reproduction range of the printer largest.

Next, in a step S62, on the basis of the lattice point data of the lattice points on each line, which have been obtained in the step S61, internal interpolation processing is performed thereby to obtain lattice point data of lattice points other than the lattice points on the line.

Figure 7:
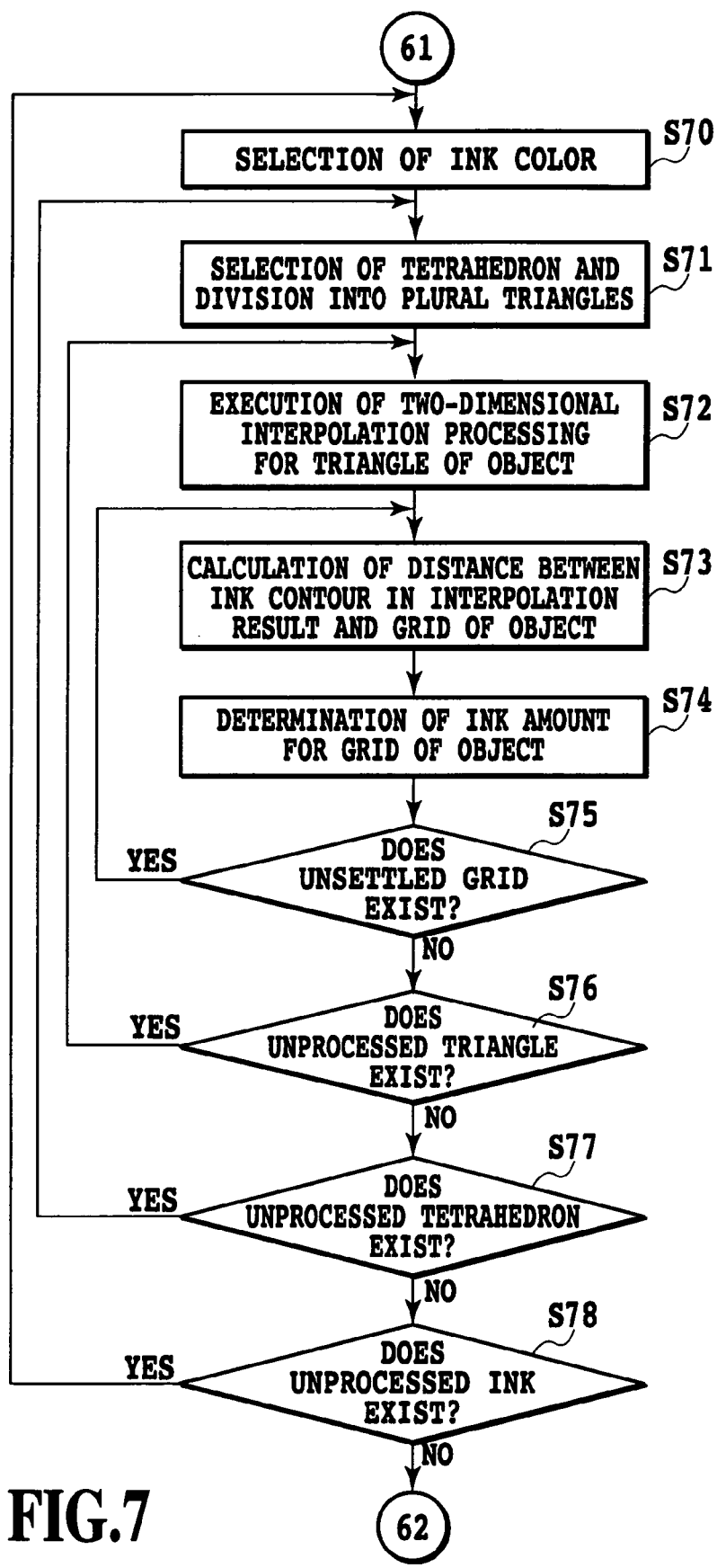
FIG. 7 is a flowchart showing the details of an internal interpolation process shown in FIG. 6.
Figure 12:
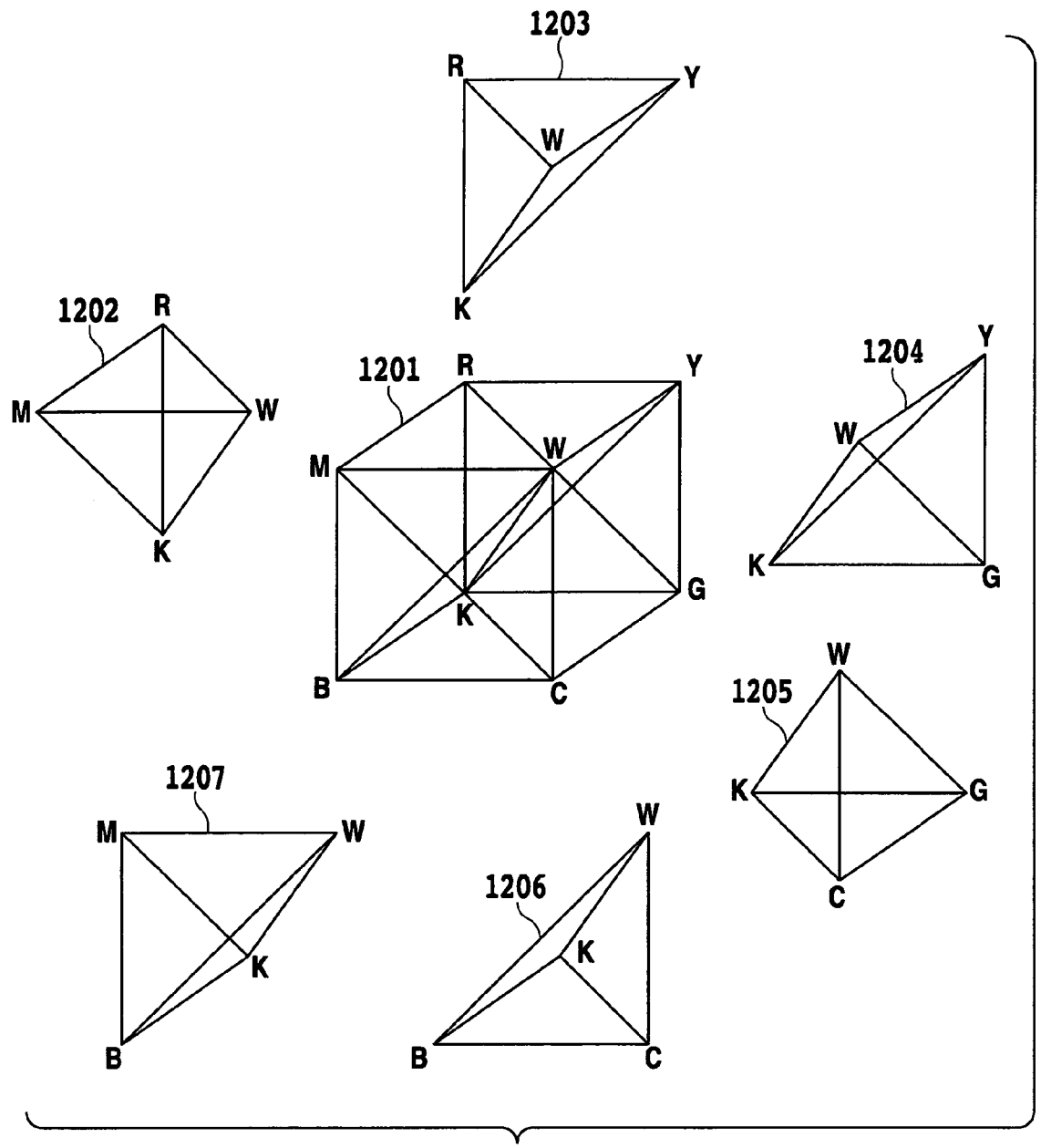
FIG. 12 is a diagram in which a cube defined by R, G, B signals is divided into six tetrahedrons.

FIG. 7 is a flowchart showing the details of the internal interpolation processing. In FIG. 7, firstly, in a step S70, an ink color is selected. Namely, in order to determine the ink value corresponding to each lattice point in subsequent steps, ink colors of cyan, magenta, yellow, and black are selected in order. Next, in a step S71, a tetrahedron for interpolation is selected, and this tetrahedron is divided into plural triangles. As shown in FIG. 12, six tetrahedrons 1202, 1203, 1204, 1205, 1206, and 1207 obtained by dividing the cube with use of the above lines are selected in order, and each tetrahedron is divided into plural triangle.

Figure 13:
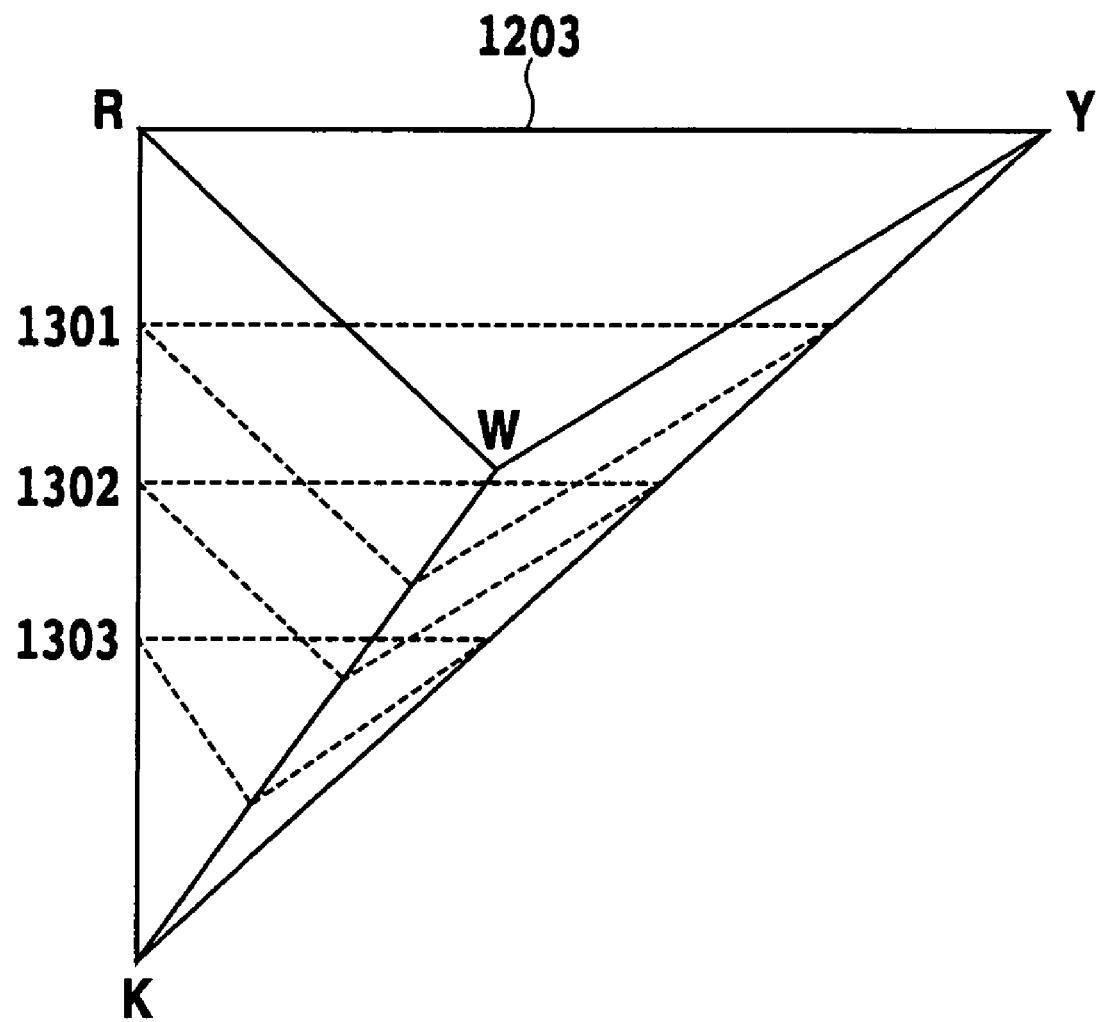
FIG. 13 is a diagram in which the above tetrahedron is further divided into triangles for interpolation processing.
Figure 15:
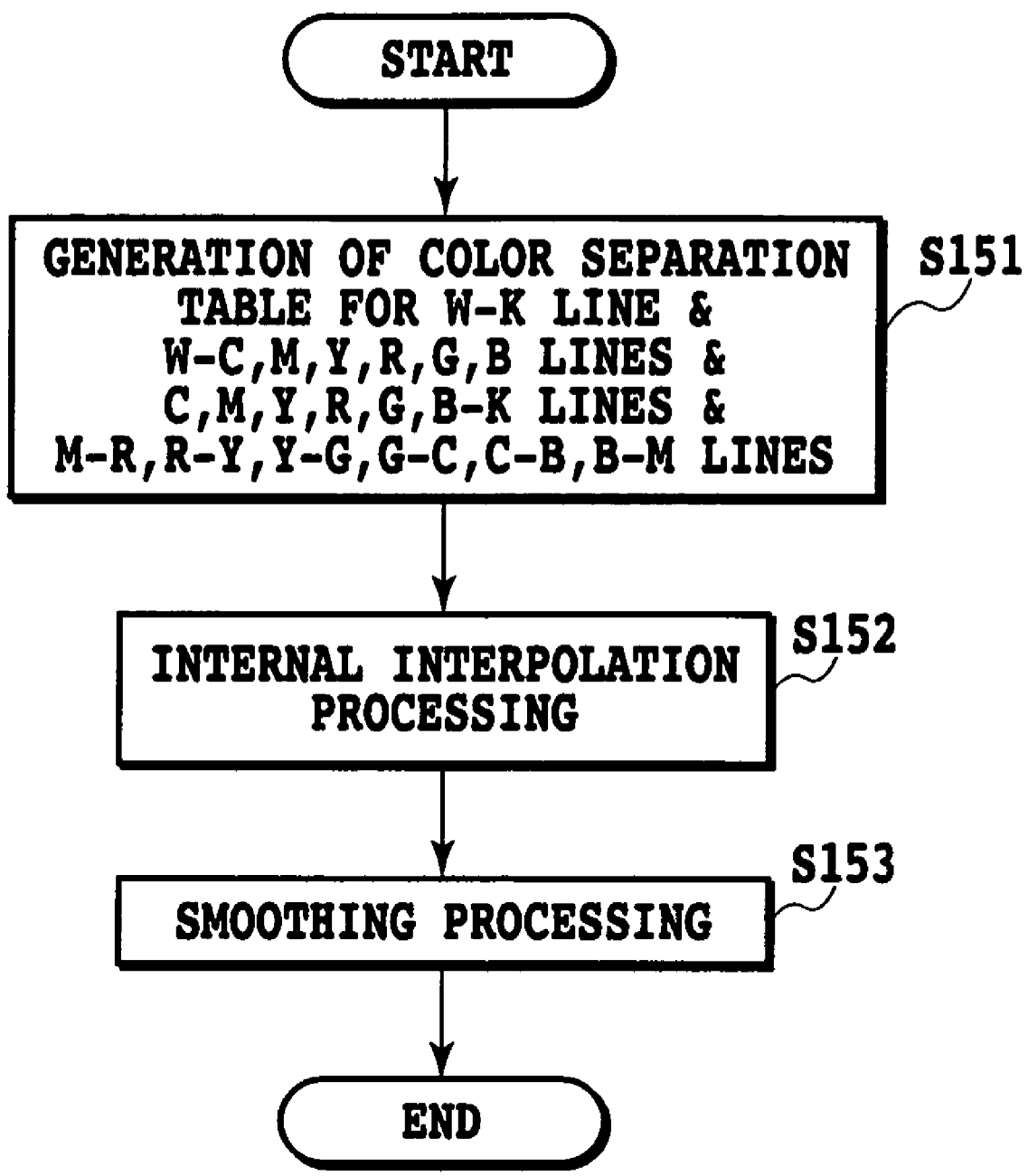
FIG. 15 is a flowchart showing a conventional table generation process.

Processing for dividing the tetrahedron into plural triangles is performed as follows. In case of a tetrahedron formed by vertexes R, Y, K and W, which is shown in FIG. 13, this can be divided into a surface triangle and inner triangles. Firstly, the tetrahedron is divided into triangle of vertexes R-Y-K, R-Y-W, K-W-R, and K-W-Y. Next, the inside of the tetrahedron RYKW is divided, by surfaces parallel to the triangle R-Y-W, into inner triangles 1301, 1302 and 1303 of the number corresponding to the number of lattice points.

Next, in a step S72, two-dimensional interpolation processing is performed for the respective object triangle obtained by the above division. Thereafter, in a step S73, distance between an ink contour of an interpolation result and each lattice point is calculated; and in a step S74, the ink value of the objective lattice point is determined. More specifically, in the calculation result of the distance between the ink contour of the interpolation result and each grid point, what is smallest in distance is determined as the ink value of the objective lattice point. In a step S75, whether an unsettled grid point exists or not is judged. In case that an unsettled grid point exists, the procedure proceeds to the step S73, and processing in the steps S73 and S74 are performed for the next grid point. For the triangle that is the object in the step S72, when the ink values of all the lattice points have been determined, the processing proceeds to a step S76. In the step S76, whether an unprocessed triangle exists or not is judged, and whether the processing has completed for the plural triangles obtained by the division in the step S71 is judged. When an unprocessed triangle exists, the procedure proceeds to the step S72, and the processing of the steps S72 to S75 are repeated. When the processing has completed for all the triangles in the tetrahedron selected in the step S71, the procedure proceeds to the step S73, and the processing of the steps S73 to s76 are repeated. When the processing has completed for all the tetrahedrons, the procedure proceeds to a step S78. In the step S78, whether unprocessed ink exists or not is judged. When the unprocessed ink exists, the procedure proceeds to the step S70, and the processing of the steps S70 to S79 are repeated. When the processing has completed for all the ink, the procedure proceeds to a step S63.

In the step S63, for the thus obtained lattice point data, smoothing processing is performed.

Figure 8:
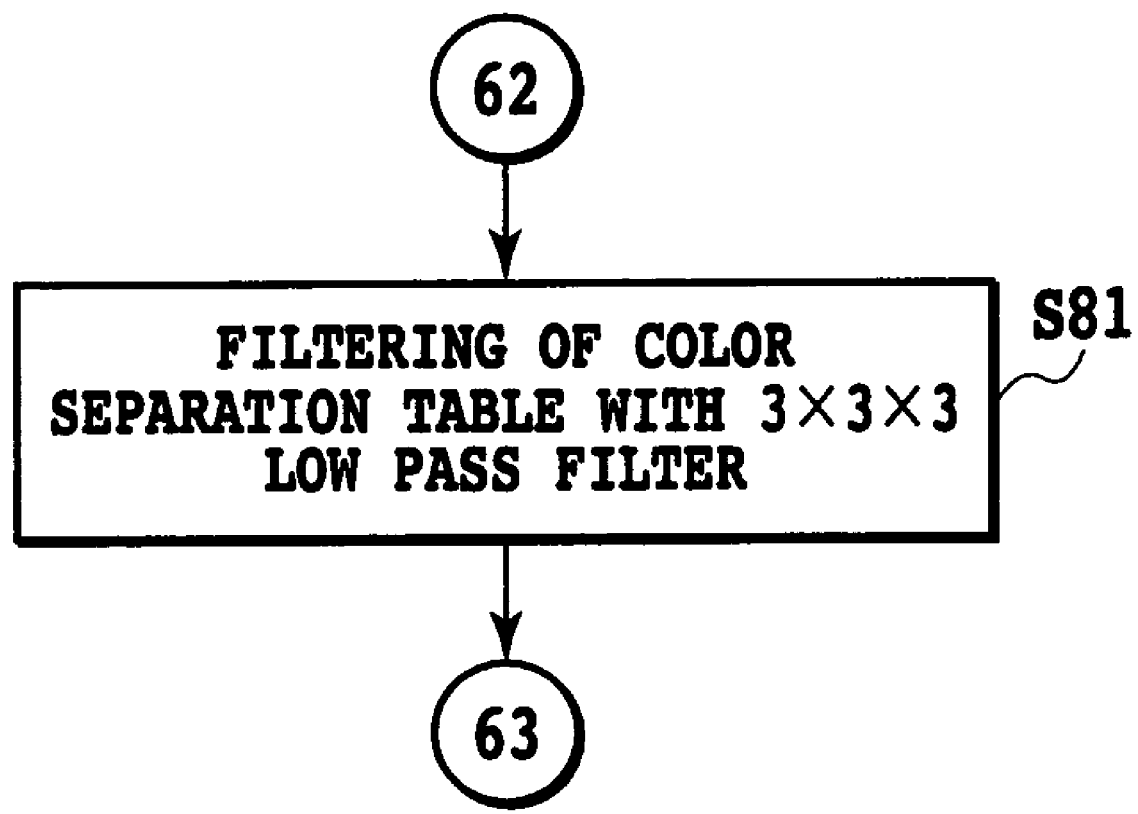
FIG. 8 is a flowchart showing the concrete processing of a smoothing process shown in FIG. 7.
Figure 11:
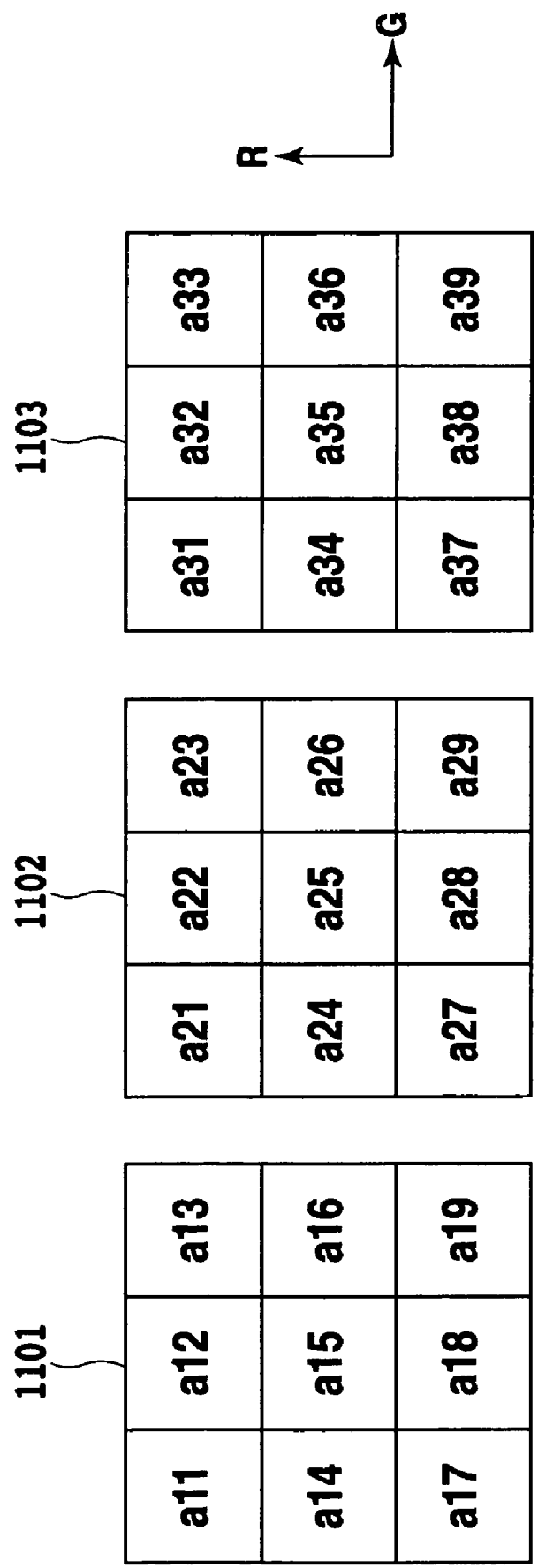
FIG. 11 is a diagram showing a parameter of a low pass filter used in the smoothing processing in the embodiment of the invention.

FIG. 8 is a flowchart showing the details of the smoothing processing in the step S63. This smoothing processing, in a step S81, is performed for the lattice point data obtained in the step S62. Specifically, using a 3×3×3 low pass filter having parameters shown in FIG. 11, filtering is performed while changing a lattice point sequentially. In this filtering, a parameter a25 in a filter element 1102 corresponds to a lattice point of a processing object. Parameters corresponding to lattice points in front and back of the lattice point of the processing object in respective R, G, and B directions of the cube are shown in filter elements 1101, 1102, and 1103. Using these parameters, for lattice point data of lattice points in a 3×3×3 range around the lattice point of the processing object, filtering is performed.

After the smoothing processing, landing amount correction processing is performed in a step S64. More specifically, in the color separation table in which the smoothing processing has been performed, for the lattice point data of the lattice point in which the total of the values of the lattice point data (Y, M, C, K) exceeds a threshold, which is a criterion of judgment that the ink landing amount is over in relation with a used printing medium, correction processing is performed. For example, when the total value of lattice point data of an object lattice point X (k1, k2, k3) exceeds the threshold, the correction is performed at the following correction ratio. When the maximum landing amount for the used printing medium is Imax, and a value obtained by converting the total value of the lattice point data of the object lattice point into the landing amount is Ix, the landing amount correction ratio p is expressed by p=Imax/Ix. By making the product of each value of the lattice point data (Y, M, C, K) and the landing amount correction ratio p, landing amount correction is performed.

In the first embodiment of the present invention, in order to prevent smoothness of the lattice point data achieved by the smoothing processing in the step S63 from being damaged by this landing amount correction processing, is the landing amount correction is performed for the object lattice point and the lattice points in the 3×3×3 range around it, and the respective landing amount correction ratios are set as follows.

FIGS. 14A and 14B are diagrams for explaining calculation parameters for this landing amount correction. FIG. 14A shows parameters for correcting the correction ratio for the respective lattice points in the 3×3×3 range around the object lattice point. FIG. 14B shows coordinates of the lattice points in the 3×3×3 range, and its positional relation is similar to that shown in FIG. 11.

A parameter for calculating the landing amount correction ratio for the object lattice point X (k1, k2, k3) is X1 as known from FIG. 14A. Therefore, the landing amount correction ratio is calculated by the following expression:

$$P\_X(k1, k2, k3) = X1 \times p$$

Here, P_X (k1, k2, k3) is the landing amount correction ratio at the lattice point X (k1, k2, k3).

A parameter for calculating the landing amount correction ratio of another lattice point around the object lattice point, for example, a point X (k1, K2, k3−1) is X2 as known from FIG. 14A. Therefore, the landing amount correction ratio is calculated by the following expression:

$$P\_X(k1, k2, k3-1) = X2 \times p$$

Here, P_X (k1, k2, k3−1) is the landing amount correction ratio at the lattice point X (k1, k2, k3−1).

Similarly, a parameter for calculating the landing amount correction ratio of a point X (k1−1, K2, k3−1) is X3 as known from FIG. 14A. Therefore, the landing amount correction ratio is calculated by the following expression:

$$P\_X(k1-1, k2, k3-1) = X3 \times p$$

Here, a magnitude relation between parameters is preferably that the parameters at the object grid point X is the greatest and the farther the parameters are separated from the object grid point, the smaller the parameters are, such as X1=1.0, X2=0.5, X3=0.25, - - - .

Upon completion of the above smoothing processing, the table generation processing shown in FIG. 6 ends.

As described above, since the landing amount correction is performed for the object lattice point and the lattice points in the 3×3×3 range around the object lattice point, the lattice point data in which the ink landing amount is over the threshold can be removed from the color separation table, and smoothness or conformability with the lattice point data of the lattice points around the object lattice point can also obtained.

Second Embodiment

In the first embodiment, only on lattice point data of a lattice point in which the ink landing amount is judged to be over, and lattice data of lattice points in the 3×3×3 range around it, the landing amount correction ratio was calculated. However, more preferably, smoothness and conformability for other lattice points than the lattice points in the 3×3 range may be also provided to suppress the false contour. A second embodiment of the present invention relates to this construction.

Figure 9:
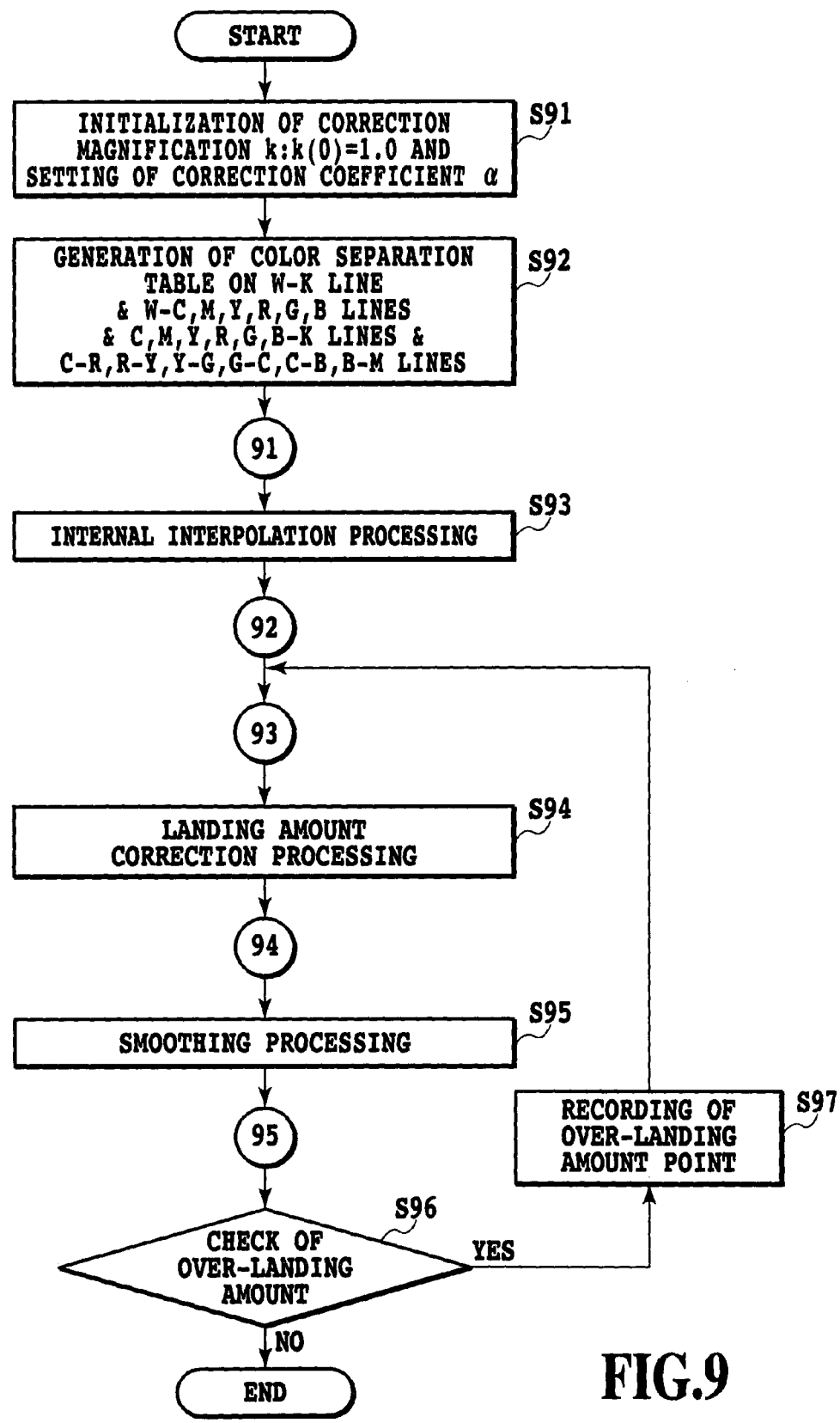
FIG. 9 is a flowchart showing table generation processing by an ink color separation table generating section 104 according to a second embodiment of the invention.

FIG. 9 is a flowchart showing table generation processing by the ink color separation table generating section 104 according to the second embodiment of the invention.

As shown in FIG. 9, in the table generation processing of this embodiment, firstly, in a step S91, the landing amount correction ratio k(n) used for landing amount correction is initialized into k(0)=1.0. Further, correction coefficient α is set. The initialization value k(0) is not set for each lattice point unlike the landing amount correction ratio p described in the first embodiment, but one same k(0) is set through the landing amount correction processing. Namely, in the embodiment, as described later, the landing amount correction processing is performed integrally for the whole of the table.

Next, in a step S92, similarly to processing of the step S61 in FIG. 6 described for the first embodiment, a color separation table on each line of W-K, M-R, R-Y, Y-G, G-C, C-B, B-M, W-C, M, Y, R, G, and B-K is generated. Next, in a step S93, similarly to processing of the step S62 in FIG. 6, an internal interpolation is performed thereby to obtain lattice point data of lattice points other than the lattice points on the above lines.

Though landing amount correction processing in a step 94 is performed using the correction ratio k, the correction ratio k is changed according to a result of over-landing amount check in a step S96. More specifically, when there is, in the color separation table, a lattice point having lattice point data in which the landing amount is judged to be over, values of all the lattice point data in the table are multiplied by the correction ratio k thereby to perform the correction of the lattice point data. Here, the landing amount correction ratio k (n) changes according to the number of times of loops. Hereby, the lattice points in which the landing amount is over, in the color separation table are corrected little by little. Lastly, the color separation table having lattice points in which the landing amount is not over is obtained.

Figure 10:
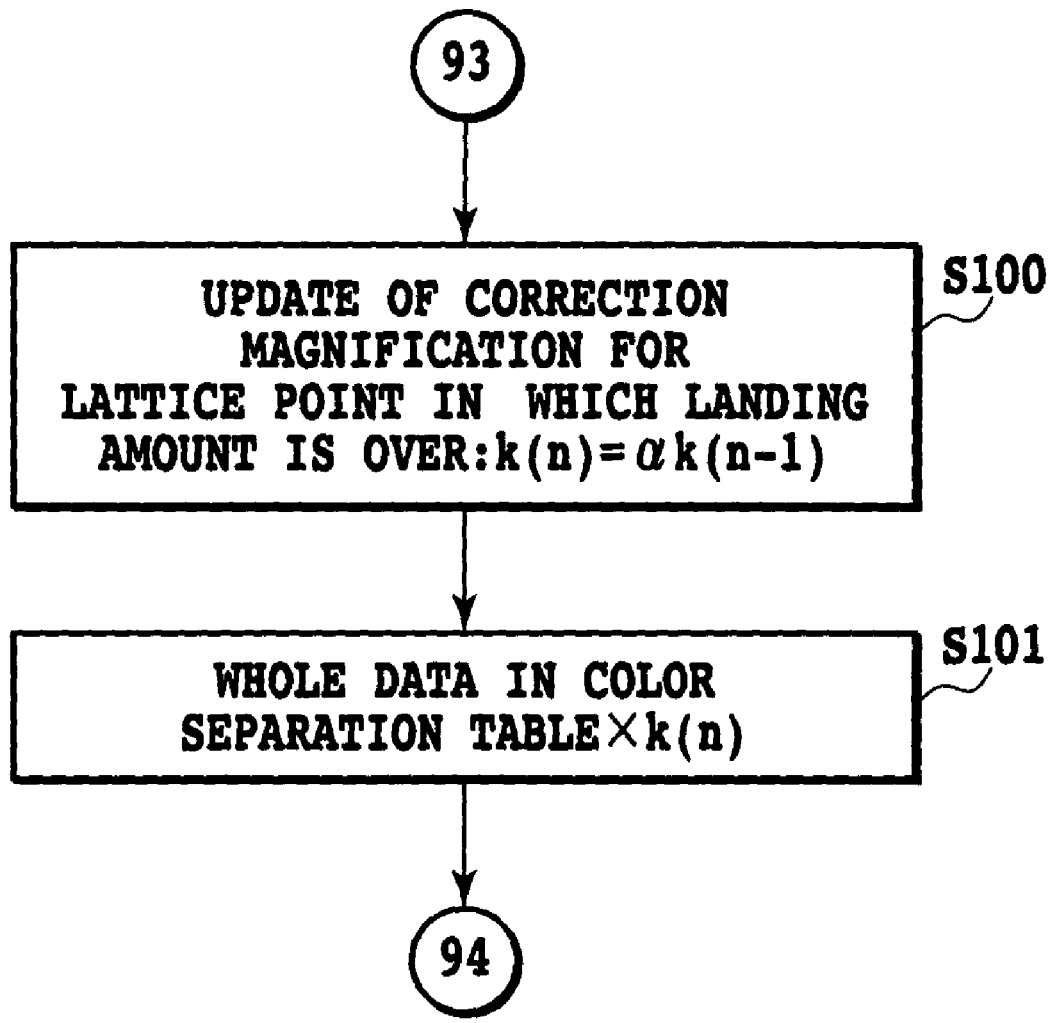
FIG. 10 is a flowchart showing the details of an ink landing amount correction process shown in FIG. 9.

FIG. 10 is a flowchart showing the details of the landing amount correction processing in the step S94. For the lattice point data of the color separation table, the landing amount correction ratio of the lattice point in which the landing amount is over is changed according to the number of times of entering a loop comprising the steps S93 to S97.

Firstly, in a step S100, the landing amount correction ratio k is set to K (n)=αk (n−1). Here, n is the number of times of entering the loop. Namely, n is the number of times which the procedure returns to the step S94 by judgment in the step S96 described later. Every time the procedure returns to the processing in the step S94, the correction ratio k is multiplied by α. In case that the initialization value k (0) is used, the landing amount correction ratio k can be expressed by k (n)=αnk (0).

Next, in a step S101, the whole lattice point data of the color selection table is multiplied by the landing amount correction ratio k (n) thereby to perform the correction. By thus performing the landing amount correction for the whole of the table integrally, compared with the case where the landing amount correction is performed for a partial portion such as the 3×3×3 area, the influence on the smoothing processing can be reduced.

For the color separation table for which the landing amount correction processing in the step S94 has been performed, smoothing processing is performed in a step S95. This processing is performed similarly to the processing of the step S63 in FIG. 6. Next, in a step S96, on the table after the smoothing processing, the lattice point data of the whole table are compared with the maximum landing amount of the printing medium, and whether there is a lattice point having lattice point data in which the landing amount is over or not is checked. In case that there is not the lattice point having the lattice point data in which the landing amount is over, this processing ends. In case that there is the lattice point having the lattice point data in which the landing amount is over, the procedure returns to the step S94. In a step S97, using the check result in the step S96, the lattice point in which the landing amount is over is recorded in the color separation table.

As described above, for the lattice point data in the color separation table, the portions in which the landing amount is over are corrected little by little, and such the landing amount correction processing that the influence on the smoothing processing in the step S95 is minimized is performed, whereby over-landing amount of ink in the printing image can be prevented, and occurrence of the false contour can be also suppressed.

Other Embodiments

The invention, as described above, may be applied to a system comprising plural devices (for example, a host computer, an interface device, a reader, and a printer) or to an apparatus comprising one device (for example, a copying machine and a facsimile).

Further, the following belongs to the category of the invention: what supplies a program code of software for realizing the functions in the embodiments shown in FIGS. 6 to 10 to a computer in an apparatus or in a system which is connected to various devices so as to actuate their devices to realize the functions in the embodiments, and causes the computer (CPU or MPU) in the system or the apparatus to operate the various devices in accordance with the stored program.

In this case, the program code itself of the software realizes the functions in the embodiments. This program code itself, and a unit for supplying its program code to the computer, for example, a recording medium which stores such the program code constitute the invention.

As the recording medium which stores such the program code, for example, a floppy (registered trademark) disc, a hard disc, an optical disc, a magneto optical disc, CD-ROM, a magnetic tape, a nonvolatile memory card, and ROM can be used.

Not only by execution of the supplied program code by the computer, but also in cooperation of the program code with OS(operating system) operating in the computer or with another application soft, the functions in the embodiments are realized. In this case, naturally, such the program code is included in the embodiment of the invention.

Further, after the supplied program code has been stored in a memory provided for an extension board of the computer or an extension unit connected to the computer, also in case that CPU provided for the extension board or the extension unit performs a part or all of the actual processing on the basis of instructions from the program code, and the functions in the embodiments are realized by its processing, naturally, such the program code is included in the invention.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2004-176211 filed Jun. 14, 2004, which is hereby incorporated by reference herein.

What is claimed is:

1. A color processing apparatus for generating a color separation table used for converting image signals into signals of color materials used in a printing apparatus, said color separation table storing grid point data as amounts of color materials represented by the color material signals correspondingly to grid points defined in a color space of the image signals, said apparatus comprising:
    a table data obtaining unit configured to obtain the grid point data corresponding to the grid points of the color separation table;
    a correction unit configured to perform a correcting process for the grid point data so as to reduce the amount of color material represented by the obtained grid point data;
    a smoothing unit configured to perform a smoothing process for the grid point data that have been subjected to the correcting process by said correction unit; and
    a determining unit configured to determine whether the amount of color material represented by the grid point data that have been subjected to the smoothing process exceeds a threshold value on a landing amount of the color material to a print medium, and to determine whether to make said correction unit perform the correcting process repeatedly so that the amount of color material represented by the grid point data that have been subjected to the smoothing process does not exceed the threshold value when the amount of color material represented by the grid point data that have been subjected to the smoothing process is determined to exceed the threshold value.

2. A color processing apparatus as claimed in claim 1, wherein said table data obtaining means obtains the grid point data of the grid points on predetermined lines connecting vertexes of a cube defined by the color signals, and obtains the grid point data of the grid points other than the grid points on the predetermined lines by executing an interpolation operation for each of plural solids into which the cube is divided and which is formed with a part of the predetermined lines, using the grid point data of the grid points on the predetermined lines.

3. A color processing apparatus as claimed in claim 1, further comprising a determining unit configured to determine whether the grid point data that exceeds the predetermined value exists for the grid point data corrected by said correction means, and wherein said correction unit, which executes the correction with use of a correction ratio obtained by multiplying an initial value of the correction ratio by a correction coefficient, executes the correction with use of the correction ratio obtained by multiplying the initial value by the correction coefficient progressively, every time said determining unit determines that the grid point data that exceeds the predetermined value exists.

4. A color method of generating a color separation table used for converting image signals into signals of color materials used in a printing apparatus, the color separation table storing grid point data as amounts of color materials represented by the color material signals correspondingly to grid points defined in a color space of the image signals, said method comprising:
- a table data obtaining step, carried out by a processor, of obtaining the grid point data corresponding to the grid points of the color separation table;
- a correction step of performing a correcting process for the grid point data so as to reduce the amount of color material represented by the obtained grid point data;
- a smoothing step of performing a smoothing process for the grid point data that have been subjected to the correcting process in said correction step; and
- a determining step of performing a determining process for determining whether the amount of color material represented by the grid point data that have been subjected to the smoothing process exceeds a threshold value on a landing amount of the color material to a print medium, and for determining whether to make said correction step perform the correcting process repeatedly so that the amount of color material represented by the grid point data that have been subjected to the smoothing process does not exceed the threshold value when the amount of color material represented by the grid point data that have been subjected to the smoothing process is determined to exceed the threshold value.

5. A color processing method as claimed in claim 4, wherein said table data obtaining step includes obtaining the grid point data of the grid points on predetermined lines connecting vertexes of a cube defined by the color signals, and obtaining the grid point data of the grid points other than the grid points on the predetermined lines by executing an interpolation operation for each of plural solids into which the cube is divided and which is formed with a part of the predetermined lines, using the grid point data of the grid points on the predetermined lines.

6. A color processing method of converting image signals into signals of color materials using a color separation table used for converting image signals into the signals of color materials used in a printing apparatus, said color separation table storing grid point data as amounts of color materials represented by the color material signals correspondingly to grid points defined in a color space of the image signals, the method comprising:
- a table data obtaining step, carried out by a processor of obtaining the grid point data corresponding to the grid points of the color separation table;
- a correction step of performing a correcting process for the grid point data so as to reduce the amount of color material represented by the obtained grid point data;
- a smoothing step of performing a smoothing process for the grid point data that have been subjected to the correcting process in said correction step; and
- a determining step for performing a determining process for determining whether the amount of color material represented by the grid point data that have been subjected to the smoothing process exceeds a threshold value on a landing amount of the color material to a print medium, and for determining whether to make said correction step perform the correcting process repeatedly so that the amount of color material represented by the grid point data that have been subjected to the smoothing process does not exceed the threshold value when the amount of color material represented by the grid point data that have been subjected to the smoothing process is determined to exceed the threshold value.

7. A computer-readable storage medium encoding a program for causing a computer to execute a process of generating a color separation table used for converting image signals into signals of color materials used in a printing apparatus, the color separation table storing grid point data as amounts of color materials represented by the color material signals correspondingly to grid points defined in a color space of the image signals, said program causing the computer to perform:
- a table data obtaining step of obtaining the grid point data corresponding to the grid points of the color separation table;
- a correction step for performing a correcting process for the grid point data so as to reduce the amount of color material represented by the obtained grid point data;
- a smoothing step of performing a smoothing process for the grid point data that have been subjected to the correcting process in said correction step; and
- a determining step for performing a determining process for determining whether the amount of color material represented by the grid point data that have been subjected to the smoothing process exceeds a threshold value on a landing amount of the color material to a print medium, and for determining whether to make said correction step perform the correcting process repeatedly so that the amount of color material represented by the grid point data that have been subjected to the smoothing process does not exceed the threshold value when the amount of color material represented by the grid point data that have been subjected to the smoothing process is determined to exceed the threshold value.

8. A printing apparatus that converts image signals into signals of color materials using a color separation table, the color separation table storing grid point data as amounts of color materials represented by the color material signals correspondingly to grid points defined in a color space of the image signals, said apparatus comprising:
- a table data obtaining unit configured to obtain the grid point data corresponding to the grid points of the color separation table;
- a correction unit configured to perform a correcting process for the grid point data so as to reduce the amount of color material represented by the obtained grid point data;
- a smoothing unit configured to perform a smoothing process for the grid point data that have been subjected to the correcting process by said correction unit; and
- a determining unit configured to perform a determining process for determining whether the amount of color material represented by the grid point data that have been subjected to the smoothing process exceeds a threshold value on a landing amount of the color material to a print medium, and for determining whether to make said correction unit perform the correcting process repeatedly so that the amount of color material represented by the grid point data that have been subjected to the smoothing process does not exceed the threshold value when the amount of color material represented by the grid point data that have been subjected to the smoothing process is determined to exceed the threshold value.

* * * * *